(12) United States Patent
Barnes et al.

(10) Patent No.: US 11,010,366 B2
(45) Date of Patent: May 18, 2021

(54) METHOD AND SYSTEM FOR IMPLEMENTING AN AUTOMATED DATA VALIDATION TOOL

(71) Applicant: JPMorgan Chase Bank, N.A., New York, NY (US)

(72) Inventors: James Todd Barnes, Katy, TX (US); Gowravi Padmegowda, Houston, TX (US); David Logan, Glasgow (GB); Francis McHugh, Glasgow (GB); Ian McMillan, Glasgow (GB); Rakesh Sharma, Glasgow (GB)

(73) Assignee: JPMorgan Chase Bank, N.A., New York, NY (US)

( * ) Notice: Subject to any disclaimer, the term of this patent is extended or adjusted under 35 U.S.C. 154(b) by 184 days.

(21) Appl. No.: 16/050,154

(22) Filed: Jul. 31, 2018

(65) Prior Publication Data
US 2020/0042623 A1 Feb. 6, 2020

(51) Int. Cl.
*G06F 7/00* (2006.01)
*G06F 17/00* (2019.01)
*G06F 16/23* (2019.01)
*G06F 16/21* (2019.01)

(52) U.S. Cl.
CPC ........ *G06F 16/2365* (2019.01); *G06F 16/214* (2019.01)

(58) Field of Classification Search
None
See application file for complete search history.

(56) References Cited

U.S. PATENT DOCUMENTS

| | | | |
|---|---|---|---|
| 9,778,923 B2* | 10/2017 | Kochhar | G06F 8/30 |
| 2005/0050210 A1* | 3/2005 | Kennedy | H04L 67/36 |
| | | | 709/229 |
| 2006/0026587 A1 | 2/2006 | Lemar Roy et al. | |
| 2013/0311423 A1* | 11/2013 | Price | G06F 16/214 |
| | | | 707/609 |
| 2014/0236649 A1 | 8/2014 | Hamid et al. | |
| 2015/0019488 A1* | 1/2015 | Higginson | G06F 16/214 |
| | | | 707/634 |

(Continued)

OTHER PUBLICATIONS

Notification of Transmittal of the International Search Report and the Written Opinion of the International Search Authority dated Oct. 4, 2019 in PCT/US2019/044275.

*Primary Examiner* — Tuan A Pham
(74) *Attorney, Agent, or Firm* — Hunton Andrews Kurth LLP

(57) ABSTRACT

An embodiment of the present invention is directed to an automated validation tool for migration from a source system to a target system. The system comprises: a memory component; an interactive interface that receives one or more user inputs; and a validation engine comprising a processor, coupled to the memory component and the interactive interface, the validation engine configured to perform the steps comprising: initiating a migration process from a source system to a target system; identifying a source identifier of the source system and a target identifier of the target system; performing validation of the migration process; comparing project configuration data of the source system and the target system; comparing project data of the source system and the target system; and providing, via the interactive interface, validation results.

16 Claims, 4 Drawing Sheets

(56) References Cited

U.S. PATENT DOCUMENTS

2015/0046389 A1* 2/2015 Dhayapule ............ G06F 11/079
　　　　　　　　　　　　　　　　　　　　　707/602
2017/0046143 A1* 2/2017 Kochhar .................... G06F 8/60
2017/0070505 A1* 3/2017 Lindley ................. G06F 3/0647
2018/0039648 A1* 2/2018 Han .................... H04L 41/0859

* cited by examiner

METHOD AND SYSTEM FOR IMPLEMENTING AN AUTOMATED DATA VALIDATION TOOL

FIELD OF THE INVENTION

The present invention generally relates to a validation tool and more specifically to an automated data validation tool that performs confirmation and validation of complex migrations from a legacy platform to a target platform.

BACKGROUND OF THE INVENTION

Defect or issue tracking systems, such as JIRA, oftentimes service tens of thousands of technologists and support staff. To support various applications and services, any large company may create additional instances of a JIRA platform to support the growing needs of the development community. For example, a global banking entity may have over 20 instances of the platform to support various activities. As new services and products evolve, a vendor may introduce a new clustered architecture, such as a data center system, that essentially removes the need for the standalone instances, e.g., server farms. However, with the introduction of new clustered architectures, oftentimes the vendor does not provide functionality to move projects from the standalone instances to the new data center architecture. For large companies, estimates from outside consulting firms to migrate the projects and data are generally in the millions. Further, these estimates do not provide any assurances or confirmation that data in the target location (data center) is identical to the source location (standalone instances) and that the underlying platform is validated prior to production use.

Accordingly, current vendors do not offer a validation methodology to move projects and data between their legacy and current versions. Instead, current practices suggested by vendors is to start fresh in the new environment. However, historical data is necessary to maintain developmental delivery dates as well as to maintain complete audit records of past defects and releases. As a result, companies are required to perform a manual, labor intensive procedure to transfer complex data to the new platform.

These and other drawbacks exist.

SUMMARY OF THE INVENTION

Accordingly, one aspect of the invention is to address one or more of the drawbacks set forth above. According to an embodiment of the present invention, an automated computer implemented system that implements an automated validation tool comprises: a memory component; an interactive interface that receives one or more user inputs; and a validation engine comprising a processor, coupled to the memory component and the interactive interface, the validation engine configured to perform the steps comprising: initiating a migration process from a source system to a target system; identifying a source identifier of the source system and a target identifier of the target system; performing validation of the migration process; comparing project configuration data of the source system and the target system; comparing project data of the source system and the target system; and providing, via the interactive interface, validation results.

According to another embodiment of the present invention, an automated computer implemented method that implements an automated validation tool comprises the steps of: initiating a migration process from a source system to a target system; identifying, via a validation engine, a source identifier of the source system and a target identifier of the target system; performing, via the validation engine, validation of the migration process; comparing project configuration data of the source system and the target system; comparing project data of the source system and the target system; and providing, via the interactive interface, validation results.

The system may include a specially programmed computer system comprising one or more computer processors, interactive interfaces, electronic storage devices, and networks.

The computer implemented system, method and medium described herein provide unique advantages to entities, organizations, database administrators and software developers. An embodiment of the present invention provides an innovative tool to quickly and easily validate data to ensure a smooth migration from a source standalone system to target data center platforms. Without this validation, a company is forced to simply accept any data errors stemming from an outside consulting effort and remediate with unknown impacts to development teams. By utilizing this solution, the company is able to realize significant cost savings, significantly reduce operational risk by confirming the migration of data, and further ensure delivery dates are not missed due to an incomplete data transfer or system issue.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

Figure 1:
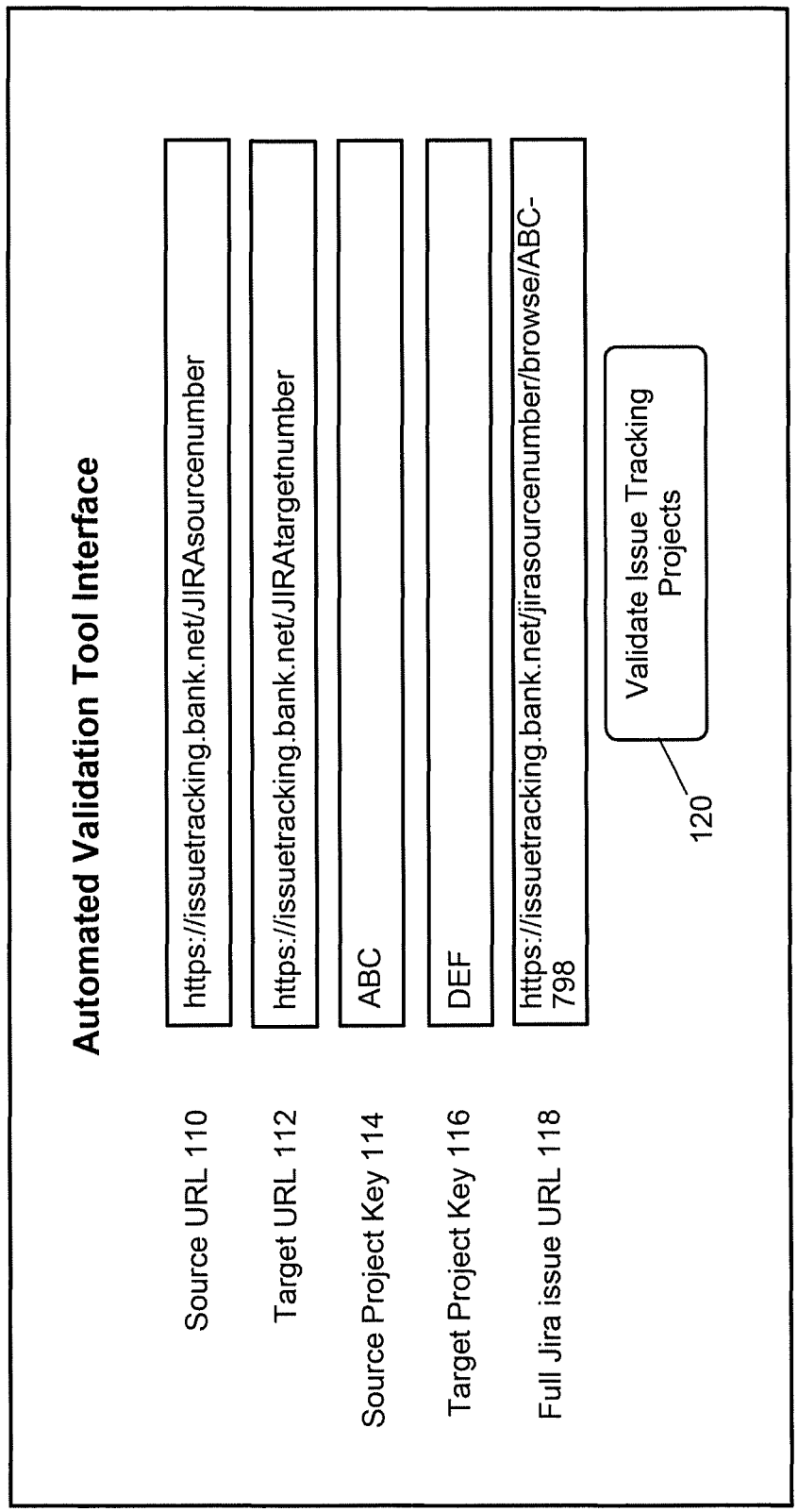
FIG. 1 illustrates an exemplary interactive interface of an Automated Validation Tool, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention provides a side-by-side comparison of source data sets and target data sets for an issue tracking project, such as a JIRA project. JIRA is an example of an issue tracking system that provides bug tracking, issue tracking and project management functions. An exemplary embodiment of the present invention may be applied to JIRA projects. However, JIRA projects are one example and the innovations of the present invention may be applied to various issue tracking systems and other similar systems.

In an exemplary issue tracking system, the underlying data may include thousands and thousands of entries. An embodiment of the present invention may be directed to providing and ensuring a smooth migration from a source, such as a standalone server farm, to a target platform, such as a data center system. For example, the migration may involve projects, data, users, workflows, and/or other information. The validation may occur on a project-by-project, issue-by-issue, group-by-group and bit-by-bit basis. In this example, the validation may involve validating project specifics and characteristics, such as internal groups, relationships, database entries, etc. With the various features of an embodiment of the present invention, an entity realizes significant cost savings and reduced operational risk.

An embodiment of the present invention enables a user to input a source and a destination as well as Project Keys into the validation engine to baseline and compare project data and configuration and present results. The source and destination may be identified by a URL or other location identifier. Each project configuration may be validated against multiple components used within system schemes (e.g., issue tracking system schemes) including Issue Type, Workflow, Permission, Notification, Screens, etc. Once the configuration has been validated, the validation engine may proceed with data comparison. This may include determining various metrics, such as total issue count, linked issues, counts by issue type, filters, attachments, etc. Detailed validation results may be attached to or otherwise associated with a specified JIRA Issue URL or JIRA ticket and may be further downloaded using a user interface, such as a Download Log File button. The information may include reports, analytics and/or other output of data and metrics. For example, a completed log file may be downloaded to local file system using Download Log File button, which may include logs from other threads if running in parallel.

An embodiment of the present invention is directed to providing an entry by entry check to determine if a system, such as an issue tracking system, is not only viable but also contains an acceptable copy of source data prior to production implementation. Some applications may require an exact copy or at least a representative or workable copy of source data. Depending on the application, varying degrees of exactness of data migration may be applied.

An embodiment of the present invention is directed to ensuring that the migrated data is properly preserved for auditing purposes. This further expedites and ensures compliance with various regulatory requirements.

An embodiment of the present invention may perform data validation for various types of data migration, including source code and related data from a legacy platform to a target platform. Additional details of automated migration tools are described in commonly owned and currently pending patent applications U.S. patent application Ser. No. 15/587,632, filed May 5, 2017, and U.S. patent application Ser. No. 15/587,849, filed May 5, 2017, the contents of which are incorporated by reference herein in their entirety.

According to an embodiment of the present invention, the Automated Migration Tool may initiate an approval process with an internal request system. For example, a project owner may verify a migration on a particular day (or time range). The project owner may interact with the Automated Migration Tool via an interactive user interface. The user may provide a source platform and a target platform. In addition, the source and target data may be automatically generated by the system, based on the project, user identification, etc.

The Automated Migration Tool may then perform an analysis of the underlying source code and identify tags, branches and other types and forms of metadata. The Automated Migration Tool may further identify and/or analyze underlying ties, links, hyperlinks and/or other associated data. In addition, the Automated Migration Tool may identify and/or analyze configuration data and special hooks and programs that are accessed and/or required by the source code. For example, before code is committed, certain validations may need to be met—such data may also be identified and analyzed for migration. The Automated Migration Tool also migrates underlying users, permissions, authorizations, etc. Accordingly, when the migration occurs, the users that were able to work against in the code in the source platform may continue to work on the code in the target platform, without any disruptions or requirements for configuration or installation.

FIG. 1 illustrates an exemplary interactive interface of an Automated Validation Tool, according to an embodiment of the present invention. The Validation Engine of an embodiment of the present invention compares source and destination projects and returns validation results. The projects may specifically represent JIRA and/or other issue tracking projects. In this example, a user may enter a source platform URL at 110 and a target platform URL at 112. The interface may also enter a source project key at 114 from a source server and target project key at 116 from a target server. A full JIRA issue URL may be provided at 118. Validation may be initiated at 120.

The Automated Validation Tool may be applied prior to, during and/or after a data migration process which may include projects and repositories. For example, a validation may be applied after migration of projects, repositories, repository data, pull requests for repositories and audit logs for both projects and repositories. In addition, the migration may also migrate project and repository level permissions. Once the source platform project is ready to be migrated to the target platform, the Tool retrieves the source platform project URL including the project key from the project owners.

According to an exemplary embodiment, migration of projects and repositories may occur before the migration is validated. In this example, once migration of projects and repositories is complete, a validation of project, repos, repository data and hooks configurations may be executed. Once validated, permissions may be migrated. Other scenarios may be applied.

Figure 2:
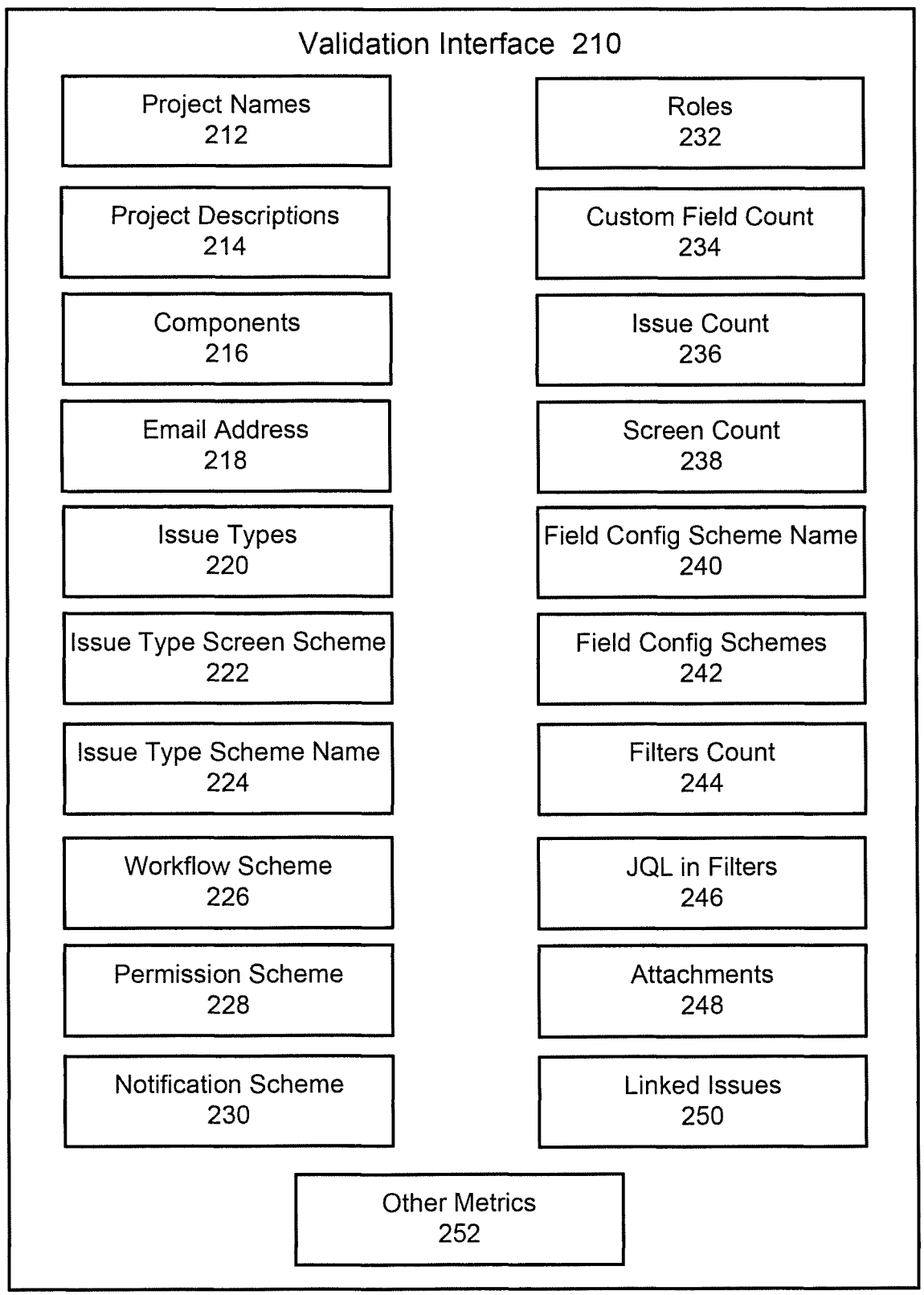
FIG. 2 illustrates an exemplary interactive interface of a Results Output, according to an embodiment of the present invention.

FIG. 2 illustrates an exemplary interactive interface of a Results Output, according to an embodiment of the present invention. An interactive interface, as represented by Validation Interface 210, of an embodiment of the present invention, may display validation results. For example, Validation Interface 210 may provide a comparison of various metrics, including Project Names 212, Project Descriptions 214, Components 217, Email Address 218, Issue Types 220, Issue Type Screen Scheme 222, Issue Type Scheme Name 224, Workflow Scheme 226, Permission Scheme 228, Notification Scheme 230, Roles 232, Custom Field Count 234, Issue Count 236, Screen Count 238, Field Configuration Scheme Name 240, Field Configuration Schemes 242, Filters Count 244, JQL in Filters 246, Attachments 248, Linked Issues 250, etc. Validation Interface may also provide other metrics, including total number of counts, time of completion as well as suggested actions to address inconsistencies at 252.

Other validation features may include workflow transitions, workflow conditions, workflow validators, workflow post functions, etc.

An embodiment of the present invention may compare the various parameters for a given source and destination project, such as a JIRA project. FIG. 2 illustrates an exemplary set of parameters. The innovative system and method may support various sets of parameters. For example, a subset of parameters illustrated in FIG. 2 may be compared. Also, depending on the application, implementation and various other factors, the innovative system and method may consider other parameters for validation.

FIG. 2 illustrates an exemplary interface. The system may provide varying levels of detail for each parameter. For example, the system may display a match or mismatch indicator. In addition, the system may identify details of the mismatch through a drop-down window, expanding tree structure or other graphic. The system may include a user friendly graphic, e.g., such as color schemes, to represent the number, level and/or severity of mismatches based on various levels of granularity. The system may also provide a side-by-side comparison with the mismatches or differences highlighted. The system may further indicate specifics of the mismatch, including tasks, subtasks, issues, characters, etc. Other variations may be applied.

For Project Names 212, the system may retrieve a project name, e.g., the JIRA Project Name, from source and destination project and determine if they match.

For Project Descriptions 214, the system may retrieve a project description, e.g., the JIRA Project description from source and destination project and determine if they match.

For Components 217, the system may retrieve a list of components associated with source and destination projects and determine if they match. Components represent a method of tagging issues according to a pre-defined definition of the underlying team. For issues that are related to a UI, a set of issues may have a component tag of UI. Likewise, a component named Database may include the set of issues which align to the Database. An issue may possess a component, multiple components, or no component. The component names are created by a user by entering a desired name or other identifier. If the component is already present, the issue may be tagged. If no component exists, the system may prompt the user to create a new component for tagging purposes. In addition, other examples may include tagging issues related to a specific release for future reference and reporting.

For Email Address 218, the system may retrieve an Email address associated with source and destination projects and determine if they match. Other modes of communication may be compared, including phone number, identifiers, usernames and/or other contact information.

For Issue Types 220, the system may retrieve a list of issue types associated with source and destination projects and determine if they match.

For Issue Type Screen Scheme 222, the system may retrieve an Issue type Screen scheme name associated with source and destination projects and determine if they match.

For Issue Type Scheme Name 224, the system may retrieve an Issue Type Scheme Name associated with source and destination projects and determine if they match.

For Workflow Scheme 226, the system may retrieve the Workflow scheme name associated with source and destination projects and determine if they match.

For Permission Scheme 228, the system may retrieve Permission Scheme name associated with source and destination projects and determine if they match.

For Notification Scheme 230, the system may retrieve a Notification Scheme name associated with source and destination projects and determine if they match.

For Roles 232, the system may retrieve a list of JIRA Roles associated with source and destination projects and determine if they match.

For Custom Field Count 234, the system may determine a count of the number of custom fields on the source and destination project and determine if the counts match.

For Issue Count 236, the system may determine a count of the number of issues on the source and destination project and determine if the counts match.

For Screen Count 238, the system may determine a count of screens associated with the project.

For Field Configuration Scheme Name 240, the system may retrieve a field configuration scheme name associated with source and destination projects and determine if they match.

For Field Configuration Schemes 242, the system may retrieve a list of field configuration schemes associated with source and destination projects and determine if they match.

For Filters Count 244, the system may retrieve a count of filters associated with users that belong to the source and destination project and determine if they match.

For JQL in Filters 246, the system may retrieve a JQL list for each project and check if they match. JQL represents Jira Query Language, which is an extension for Java that provides support for querying collections of objects. For example, JQL queries may be executed over objects in collections.

For Attachments 248, the system may determine a count of the number of attachments per issue on the source and destination and determine if they match. The system may also identify subsets of attachments by type or other classification.

For Linked Issues 250, the system may determine a count of the number of links per issue on the source and destination and determine if they match.

An embodiment of the present invention also considers compliance issues. For example, an entity may be required to perform internal and external audits. Accordingly, there is a need to retain records. An embodiment of the present invention enables an entity to manage and maintain records efficiently while staying compliant with various rules, regulations and policies, e.g., retention policies. An embodiment of the present invention may also provide an audit trail that provides verification details and confirmations concerning the migration.

Based on the number and/or quality of mismatch, an embodiment of the present invention may provide actions to address the mismatches. For example, the system may provide a list of mismatched items and further indicate steps to remedy and/or otherwise address the mismatches. Also, the system may categorize the mismatch based on severity. If the mismatch relates to critical services and tasks, the system may provide additional details, reasons for failure and suggestions. If the mismatch relates to noncritical data, the system may provide the ability to override or substitute the data so that the migration may proceed. For example, in a source system, a particular issue has a description with 1500 characters. In the target system, only 1400 characters were migrated. In this example, if the last 100 characters are deemed critical, this mismatch may be fatal to the migration. However, if the last 100 characters are considered irrelevant or duplicative, the system may continue with the migration and override the mismatch.

Figure 3:
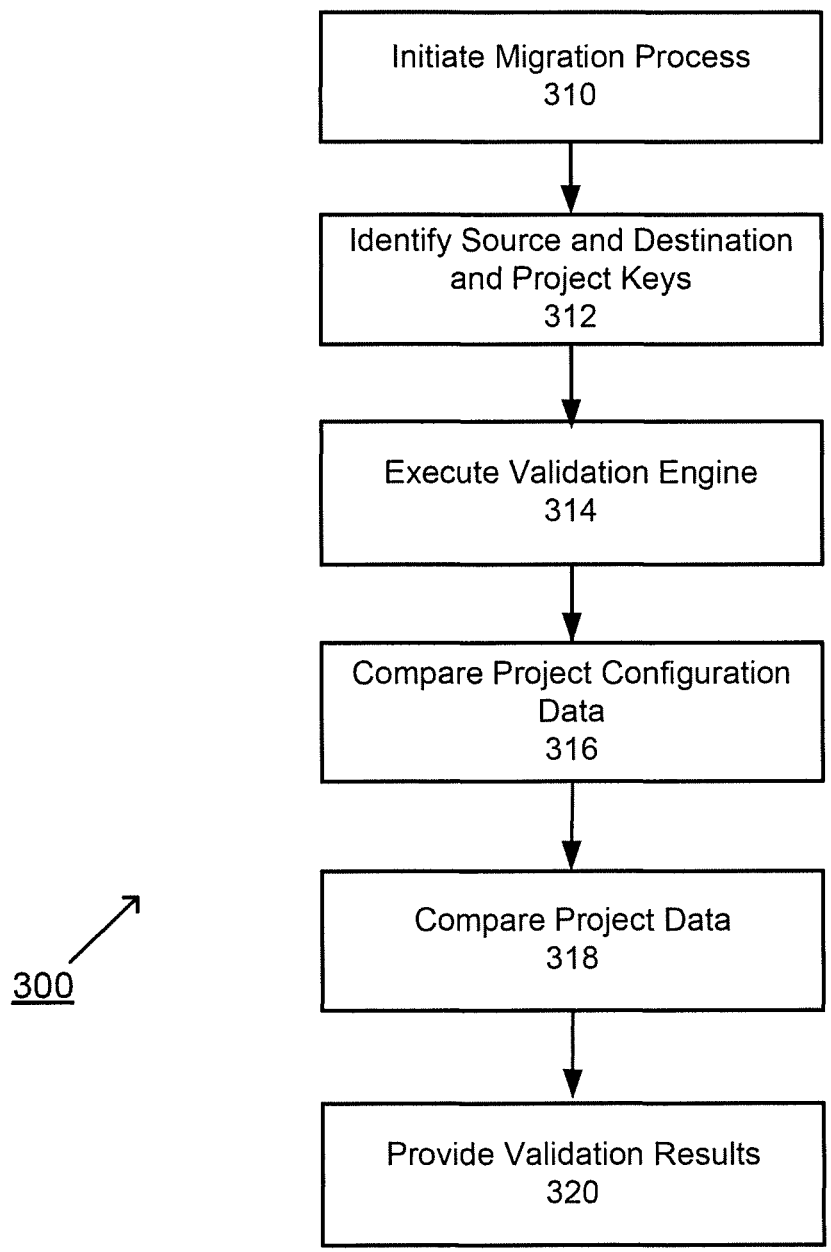
FIG. 3 is an exemplary flowchart of a method for implementing an Automated Validation Tool, according to an embodiment of the present invention.

FIG. 3 is an exemplary flowchart of a method for implementing an Automated Validation Tool, according to an embodiment of the present invention. At step 310, a migration process may be initiated. At step 312, a source and destination may be identified. This may also include identifying project keys. At step 314, a validation engine may execute to perform a validation process for a migration. At step 316, project configuration data may be compared. At step 318, project data may be compared. At step 320, validation results may be provided via an interactive interface and/or other communication mode. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. The steps of FIG. 3 are explained in further detail below.

For example, a company may manage hundreds or thousands of repositories where repositories are organized by projects (e.g., logical and practical organization of repositories). The company may seek to migrate source code with underlying metadata (e.g., history data, code requests, pull requests, code reviews, data relevant to software development, etc.) from a legacy platform to a target platform. The Tool may identify, organize and format source code and associated metadata for migration to a target platform. In addition, running logs may be provided that include details of the migration, detected errors and/or failures, a successful migration, validation results, status data, progress data, etc.

An embodiment of the present invention may provide additional validation steps and validation outputs. The Tool may validate permissions after migration in the target platform. For example, the Tool may further validate the source code after migration. For example, the Tool may validate pull request logs and audit logs.

At step 310, a migration process may be initiated. The process may be initiated by a user, scheduled and/or automatically initiated.

At step 312, a source and destination may be identified. The source may represent a legacy platform which may further support multiple instances of the platform. The destination may identify a target system, such as a data center system. The source and destination may be identified by URL and/or other location identifier. This may also include identifying project keys.

At step 314, a validation engine may execute to perform a validation process for a migration. The validation engine may compare project configuration and then perform a data comparison once the project configuration checks are passed.

At step 316, project configuration data may be compared. For each project configuration, the system may check issue type, workflow, permission, notification, screen schemes, etc.

At step 318, project data may be compared. For data comparison, the system may compare total issue counts per project and issue counts by issue type. A database count may involve checking projects, issues, schemes, etc. Data comparisons may involve workflows, screens, etc.

At step 320, validation results may be provided via an interactive interface and/or other communication mode.

Figure 4:
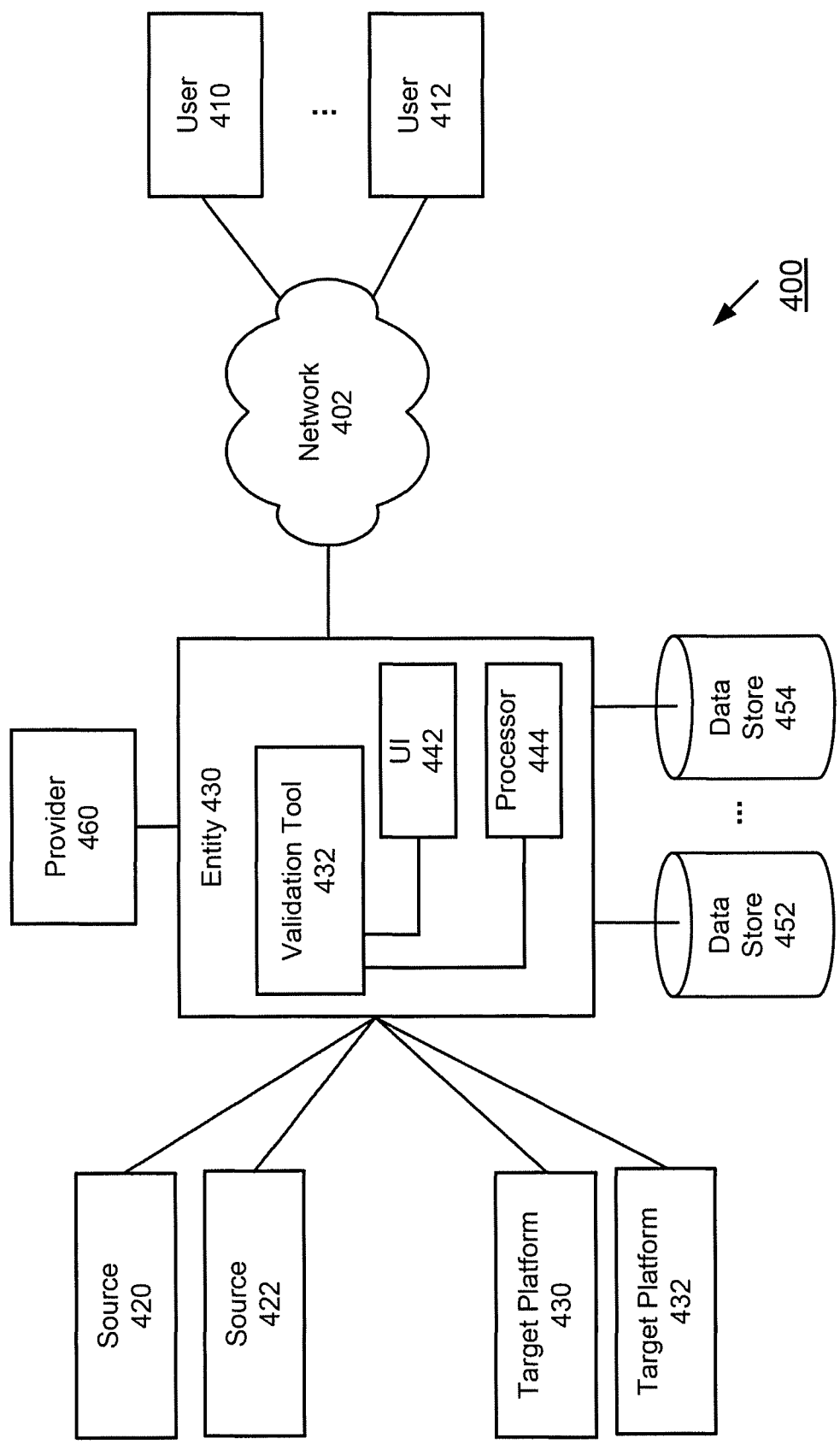
FIG. 4 illustrates a schematic diagram of a system that implements an Automated Validation Tool, according to an exemplary embodiment.

FIG. 4 illustrates a schematic diagram of a system that implements an Automated Validation Tool, according to an exemplary embodiment. As illustrated in FIG. 4, Network 402 may be communicatively coupled with one or more data devices including, for example, computing devices associated with end users, represented by User 410, 412. Users may represent administrators, such as system administrators and database administrators. Computing devices may include computers, laptops, workstations, kiosks, terminals, tablets, mobile devices, mobile phones, smart devices, etc. Network 402 communicates with Entity 430 that performs migration functions as well as system backups, archiving and other storage and maintenance functionality. Entity 430 may include a Validation Tool 432 that performs validations and comparisons of source data from Source 420, 422 and target data represented by Target Platform 430, 432, in accordance with the various embodiments of the present invention. For example, a source system may include multiple instances of a platform and the target platform may represent a data center systems. Other variations may be implemented.

Validation Tool 432 may also incorporate modules and other functions, such as User Interface 442 and Processor 444. These modules are exemplary and illustrative, Validation Tool 432 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Entity 430 may be communicatively coupled to data storage devices represented by Data stores 452, 454. Also, Data stores 452, 454 may also store and maintain audit records, indexes, attachments, archived data, reports, performance data, code, etc. The validation features described herein may be provided by Entity 430 and/or a third party provider, represented by 460, where Provider 460 may operate with Entity 430.

In accordance with the various features of an embodiment of the present invention, Validation Tool 432 may perform validation and comparisons of source and target data and further store and manage associated data in local as well as remote locations.

The system 400 of FIG. 4 may be implemented in a variety of ways. Architecture within system 400 may be implemented as hardware components (e.g., module) within one or more network elements. It should also be appreciated that architecture within system 400 may be implemented in computer executable software (e.g., on a tangible, non-transitory computer-readable medium) located within one or more network elements. Module functionality of architecture within system 400 may be located on a single device or distributed across a plurality of devices including one or more centralized servers and one or more mobile units or end user devices. The architecture depicted in system 400 is meant to be exemplary and non-limiting. For example, while connections and relationships between the elements of system 400 is depicted, it should be appreciated that other connections and relationships are possible. The system 400 described below may be used to implement the various methods herein, by way of example. Various elements of the system 400 may be referenced in explaining the exemplary methods described herein.

Network 402 may be a wireless network, a wired network or any combination of wireless network and wired network. For example, Network 402 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 402 may support an Internet network, a wireless communication network, a cellular network, Bluetooth, or the like, or any combination thereof. Network 402 may further include one, or any number of the exemplary types of networks mentioned above operating as a stand-alone network or in cooperation with each other. Network 402 may utilize one or more protocols of one or more network elements to which it is communicatively coupled. Network 402 may translate to or from other protocols to one or more protocols of network devices. Although Network 402 is depicted as one network for simplicity, it should be appreciated that according to one or more embodiments, Network 402 may comprise a plurality of interconnected networks, such as, for example, a service provider network, the Internet, a cellular network, corporate networks, or even home networks, or any of the types of networks mentioned above.

Data may be transmitted and received via Network 402 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 4 illustrates individual devices or components, it should be appreciated that there may be several of such devices to carry out the various exemplary embodiments. Entity 330 may communicate using any mobile or computing device, such as a laptop computer, a personal digital assistant, a smartphone, a smartwatch, smart glasses, other wearables or other computing devices capable of sending or receiving network signals. Customer devices may have an application installed that is associated with Entity 430.

Entity 430 may be communicatively coupled to Data Stores 452, 454 as well as remote storages. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 402, or communications may involve a direct connection between the various storage components and Entity 430, as depicted in FIG. 4. The storage components may also represent cloud or other network based storage.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented system that implements an automated validation tool, the system comprises:
    a memory component;
    an interactive interface that receives one or more user inputs; and
    a validation engine comprising a processor, coupled to the memory component and the interactive interface, the validation engine configured to perform the steps comprising:
    initiating a migration process from a source system to a target system, the migration process including the transfer of a project;
    identifying a source identifier of the source system for the project and a target identifier of the target system for the project;
    identifying a source project key and a target project key;
    performing validation of the migration process for the project based on the identified source identifier, target identifier, source project key, and target project key, the validation including:
        comparing project configuration data of the source system and the target system;
        validating the project configuration data against a set of parameters comprising issue type, workflow, permission, and notification;
        comparing project data of the source system and the target system, the comparison including determining one or more metrics including a total issue count, linked issues, counts by issue type, filters, and attachments; and providing, via the interactive interface, migration process validation results, wherein the interactive interface provides user selectable granularity for the validation results ranging from a match/mismatch indicator to a side-by-side comparison of source and target data with mismatches highlighted and specific mismatch details displayed;

wherein the source system comprises an issue tracking system with multiple instances; and wherein the source identifier and the target identifier comprises a source project key and a target project key.

2. The system of claim 1, wherein the target system comprises a data center system.

3. The system of claim 1, wherein the project configuration data comprises issue type, workflow, permissions, notification and screen schemes.

4. The system of claim 1, wherein the project configuration data comprises project names, project descriptions and components.

5. The system of claim 4, wherein the issue counts further comprise custom field counts, screen counts, filters counts.

6. The system of claim 1, wherein the project data comprises issue counts.

7. The system of claim 1, wherein the project data comprises roles, attachments and linked issues.

8. The system of claim 1, wherein the validation results are associated with a specific JIRA issue URL.

9. An automated computer implemented method that implements an automated validation tool comprises the steps of:

initiating a migration process from a source system to a target system, the migration process including the transfer of a project;

identifying, via a validation engine, a source identifier of the source system for the project and a target identifier of the target system for the project;

identifying, via the validation engine, a source project key and a target project key;

performing, via the validation engine, validation of the migration process for the project based on the identified source identifier, target identifier, source project key, and target project key, the validation including:

comparing project configuration data of the source system and the target system;

validating the project configuration data against a set of parameters comprising issue type, workflow, permission, and notification;

comparing project data of the source system and the target system, the comparison including determining one or more metrics including a total issue count, linked issues, counts by issue type, filters, and attachments; and providing, via the interactive interface, validation results, wherein the interactive interface provides user selectable granularity for the validation results ranging from a match/mismatch indicator to a side-by-side comparison of source and target data with mismatches highlighted and specific mismatch details displayed;

wherein the source system comprises an issue tracking system with multiple instances; and wherein the source identifier and the target identifier comprises a source project key and a target project key.

10. The method of claim 9, wherein the target system comprises a data center system.

11. The method of claim 9, wherein the project configuration data comprises issue type, workflow, permissions, notification and screen schemes.

12. The method of claim 9, wherein the project configuration data comprises project names, project descriptions and components.

13. The method of claim 12, wherein the issue counts further comprise custom field counts, screen counts, filters counts.

14. The method of claim 9, wherein the project data comprises issue counts.

15. The method of claim 9, wherein the project data comprises roles, attachments and linked issues.

16. The method of claim 9, wherein the validation results are associated with a specific JIRA issue URL.

* * * * *